United States Patent [19]
Wheeler, Jr. et al.

[11] Patent Number: 5,572,583
[45] Date of Patent: *Nov. 5, 1996

[54] ADVANCED INTELLIGENT NETWORK WITH INTELLIGENT PERIPHERALS INTERFACED TO THE INTEGRATED SERVICES CONTROL POINT

[75] Inventors: David F. Wheeler, Jr., Silver Spring, Md.; Robert D. Farris, Sterling, Va.

[73] Assignee: Bell Atlantic, Arlington, Va.

[ * ] Notice: The term of this patent shall not extend beyond the expiration date of Pat. No. 5,418,844.

[21] Appl. No.: 248,980

[22] Filed: May 25, 1994

Related U.S. Application Data

[63] Continuation-in-part of Ser. No. 869,931, Apr. 17, 1992, Pat. No. 5,418,844.

[51] Int. Cl.$^6$ .................................................. H04M 3/42
[52] U.S. Cl. ........................... 379/207; 379/201; 379/112; 379/229
[58] Field of Search ................................. 379/207, 201, 379/60, 112, 229

[56] References Cited

U.S. PATENT DOCUMENTS

| | | | |
|---|---|---|---|
| 3,600,522 | 8/1971 | Benson | 379/112 |
| 4,162,377 | 7/1979 | Mearns | 379/207 |
| 4,191,860 | 3/1980 | Weber | 379/115 |
| 4,313,035 | 1/1982 | Jordan et al. | 379/207 |

(List continued on next page.)

OTHER PUBLICATIONS

"Transparent Message Routing Between an 557 Network and X.25 Network", IBM Technical Disclosure Bulletin vol. 35 No. 3 pp. 434–436, Aug. 1992.

Helen A. Bauer et al, "Designing Service–Independent Capabilities for Intelligent Networks", IEEE Communications Magazine, Dec. 1988, pp. 31–41.

Berman et al., "Perspectives on the AIN Architecture", Feb. 1992, IEEE Communications Magazine, pp. 27–32.

Haselton, "Service–Creation Environments for Intelligent Networks", IEEE Communications Magazine, Feb. 1992, pp. 78–81.

Jabbari, "Intelligent Network Concepts in Mobile Communications" IEEE Communications Magazine, Feb. 1992, pp. 64–69.

Kopeikin, "ISDN Professional Service", Electrical Communication, vol. 63, No. 4 1989 pp. 366–373.

IBM View of Intelligent Network Architecture Evolution, Dr. H. Forner; ICIN, 1990, pp. 169–171.

Unisys Synthesis: A Gateway for Audiotex, Robert W. Lawson; Telephony, Jan. 16, 1989 pp. 39–41.

The Intelligent Network and Forwarding–Looking Technology, Frank J. Weisser and Randall L. Corn; IEEE Comm. Magazine, Dec. 1988 pp. 64–69.

Voice Storage Services, Tetsuya Isayama and Takeshi Mochizuki; JTR Oct. 1986 pp. 271–280.

Application of a New Network Concept for Faster Service Deployment, J. Shah and K. Prescher; IEEE, 1988 pp. 1327–1351.

*Primary Examiner*—Krista M. Zele
*Assistant Examiner*—Daniel S. Hunter
*Attorney, Agent, or Firm*—Lowe, Price, LeBlanc & Becker

[57] ABSTRACT

A peripheral platform, such as an Intelligent Peripheral (IP), is a network subsystem for use in the Advanced Intelligent Network (AIN). The IP or similar platform will assume some functions presently performed by the Integrated Service Control Point (ISCP) and central office switches. Among its functional capabilities will be voice announcement and digit collection. The more advanced version, the IP, also offers speech recognition capabilities and an array of other enhanced call processing features, such as voice or facsimile messaging. The peripheral platform or IP will be a separate network component that will communicate with the ISCP, which controls the AIN, through a data communication network that in the preferred embodiments is distinct from the telephone company switching offices, trunk networks and any associated interoffice signalling network.

42 Claims, 8 Drawing Sheets

U.S. PATENT DOCUMENTS

| | | | |
|---|---|---|---|
| 4,554,418 | 11/1985 | Toy | 379/88 |
| 4,598,367 | 7/1986 | DeFrancesco et al. | 379/93 |
| 4,611,094 | 9/1986 | Asmuth et al. | 379/207 |
| 4,611,096 | 9/1986 | Asmuth et al. | 379/207 |
| 4,656,651 | 4/1987 | Evans et al. | 379/88 |
| 4,677,552 | 6/1987 | Sibley, Jr. | 379/93 |
| 4,756,020 | 7/1988 | Fodale | 379/112 |
| 4,757,267 | 7/1988 | Riskin | 379/113 |
| 4,763,191 | 8/1988 | Gordon et al. | 379/201 |
| 4,763,353 | 8/1988 | Canale et al. | 379/157 |
| 4,769,834 | 9/1988 | Billinger et al. | 379/112 |
| 4,788,718 | 11/1988 | McNabb et al. | 379/113 |
| 4,817,129 | 3/1989 | Riskin | 379/88 |
| 4,827,500 | 5/1989 | Binkerd et al. | 379/88 |
| 4,878,240 | 10/1989 | Lin et al. | 379/67 |
| 4,879,743 | 11/1989 | Burke et al. | 379/142 |
| 4,893,335 | 1/1990 | Fuller et al. | 379/200 |
| 4,899,373 | 2/1990 | Lee et al. | 379/207 |
| 4,922,519 | 5/1990 | Daudelin | 379/112 |
| 4,926,471 | 5/1990 | Ikeda | 379/216 |
| 4,942,616 | 7/1990 | Linstroth et al. | 379/88 |
| 4,943,995 | 7/1990 | Daudelin et al. | 379/112 |
| 4,953,203 | 8/1990 | Shepard | 379/207 |
| 4,996,704 | 2/1991 | Brunson | 379/67 |
| 5,018,191 | 5/1991 | Catron et al. | 379/100 |
| 5,027,384 | 6/1991 | Morganstein | 379/67 |
| 5,029,196 | 7/1991 | Morganstein | 379/67 |
| 5,029,199 | 7/1991 | Jones et al. | 379/89 |
| 5,033,079 | 7/1991 | Catron et al. | 379/100 |
| 5,046,183 | 9/1991 | Dorst et al. | 370/110.1 |
| 5,109,405 | 4/1992 | Morganstein | 379/89 |
| 5,133,004 | 7/1992 | Heileman, Jr. et al. | 379/67 |
| 5,150,464 | 9/1992 | Sidhu et al. | 395/200 |
| 5,153,907 | 10/1992 | Pugh et al. | 379/143 |
| 5,182,766 | 1/1993 | Garland | 379/201 |
| 5,193,110 | 3/1993 | Jones et al. | 379/94 |
| 5,204,894 | 4/1993 | Darden | 378/88 |
| 5,206,899 | 4/1993 | Gupta et al. | 379/120 |
| 5,206,901 | 4/1993 | Harlow et al. | 379/211 |
| 5,208,848 | 5/1993 | Pula | 379/67 |
| 5,212,727 | 5/1993 | Ramkumar | 379/221 |
| 5,222,120 | 6/1993 | McLeod et al. | 379/216 |
| 5,222,122 | 6/1993 | Hamilton et al. | 379/32 |
| 5,222,125 | 6/1993 | Creswell et al. | 379/112 |
| 5,247,571 | 9/1993 | Kay et al. | 379/212 |
| 5,259,026 | 11/1993 | Johnson | 379/207 |
| 5,272,748 | 12/1993 | Davis | 379/216 |
| 5,353,331 | 10/1994 | Emery et al. | 379/60 |
| 5,392,402 | 2/1995 | Robrock, II | 395/200 |
| 5,418,844 | 5/1995 | Morrisey et al. | 379/207 |
| 5,469,500 | 11/1995 | Satter et al. | 379/201 |

ADVANCED INTELLIGENT NETWORK WITH INTELLIGENT PERIPHERALS INTERFACED TO THE INTEGRATED SERVICES CONTROL POINT

CROSS-REFERENCE TO RELATED APPLICATION

This application is a continuation-in-part of U.S. patent application Ser. No. 07/869,931 filed on Apr. 17, 1992 (now U.S. Pat. No. 5,418,844), issued Mar. 23, 1995, the disclosure of which is entirely incorporated herein by reference.

TECHNICAL FIELD

The present invention relates to an Advanced Intelligent Network controlled by a centralized database and having a new network node, referred to as an Intelligent Peripheral, in communication with a network switching system and with the central database.

ACRONYMS

The written description uses a large number of acronyms to refer to various services and system components. Although generally known, use of several of these acronyms is not strictly standardized in the art. For purposes of this discussion, acronyms therefore will be defined as follows:

Advanced Intelligent Network (AIN)
Central Office (CO)
Common Channel Inter-office Signalling (CCIS)
Data and Reporting System (DRS)
Integrated Service Control Point (ISCP)
Integrated Services Digital Network (ISDN)
Intelligent Peripheral (IP)
Maintenance and Operations Center (MOC)
Multi-Services Application Platform (MSAP)
Service Control Point (SCP)
Service Creation Environment (SCE)
Service Management System (SMS)
Service Switching Point (SSP)
Signaling Transfer Point (STP)
Simplified Message Desk Interface (SMDI)
Transaction Capabilities Applications Protocol (TCAP)

BACKGROUND ART

In recent years, a number of new service features have been provided by an enhanced telephone network, sometimes referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network for providing an Area Wide Centrex service was disclosed and described in detail in commonly assigned U.S. Pat. No. 5,247,571 to Kay et al., the disclosure of which is entirely incorporated herein by reference. In AIN type systems such as disclosed in the Kay et al. Patent, announcement and digit functions may be required for certain specific services. For example, a caller may be prompted by a tone or speech announcement to enter a personal identification number (PIN) before obtaining a selected service or modifying certain stored parameters relating to the subscriber's AIN service. In prior art AIN systems, a switching office of the public telephone network would generate the announcements from some internal platform.

Switched based announcements have a number of serious drawbacks. First the capacity of the internal announcement platforms has been limited, thereby limiting the number and variety of announcements which an AIN service can utilize. As AIN services become more sophisticated, a need arises to provide more announcements than such platforms offer, for example to allow subscribers to customize the announcements for their own personalized services. Adding extra announcement capacity to a number of different telephone switching offices is expensive. Often the needed extra announcement equipment can be obtained only from the original switch vendor, in view of the need for compatibility of such equipment with the switch itself.

Also, any service specific announcements must be loaded onto each switch providing the particular AIN service. Loading new announcements on large numbers of switching systems is time consuming and may require the services of expert personnel provided only by the switch equipment vendor.

Accordingly, a need exists for some platform to provide readily adaptable means to add and change announcements to an AIN, without direct addition of equipment in each central office switching system. The platform should also serve to centralize announcement capabilities to some extent, so that announcement reprogramming does not always require reprogramming some equipment for every single switch through which an enhanced service is offered.

A need also exists to provide a convenient platform to add further equipment to facilitate still further enhanced features, such as services based on speech recognition, mail services, etc., without requiring addition to or modification of equipment within the central office switching systems for each such further enhanced service feature.

Proposals have been made to add nodes to the telephone network, separate from the switching offices, to provide announcements and related enhanced service features. For example, U.S. Pat. No. 4,827,500 to Binkerd et al. discloses an announcement point which provides messages to callers, receives dialed digits and/or speech signals for input information from callers and exchanges appropriate data with a remote central 800 number database. The communication between the announcement point and the 800 database apparently goes through the same interoffice signalling network used in routing of calls between switching offices. Any new or additional messages exchanged between the 800 database and the announcement platform will inherently increase the traffic load on the interoffice signaling network.

A substantially similar network is disclosed in Weisser et al., "The Intelligent network and Forward-Looking Technology," IEEE Communications Magazine, December 1988, pp. 64–69.

U.S. Pat. No. 5,208,848 to Pula teaches connection of one or more Intelligent Peripherals (IP's) to a single switch. Reprogramming announcements for a new service presumably would require reprogramming each IP connected to each switch in the network. Also, although Pula discloses a common channel signaling link to the switch, there is no specific suggestion of any interaction of the IP with a higher level data base. As in the Binkerd et al. Patent, if any interaction with a higher level database were added, the added communication traffic to that database would have to go through the common channel signaling link and would increase traffic loading on that critical link.

U.S. Pat. No. 5,206,901 to Harlow et al. discloses a service circuit node which plays announcements, collects digits and communicates with an Service Control Point (SCP) database to update intelligent network service files. The service circuit node serves a plurality of switching offices, apparently by routing calls through the public switched telephone network to the one service circuit node. As in the Binkerd et al. and Pula systems, the communications between the service circuit node and the SCP apparently go through the switching office directly connected to the service circuit node and the signaling channel which carries queries and responses between that switching office and the SCP, and creates increased traffic on the signaling network. Attention is also directed to Shah et al., "Application of a New Network Concept for Faster Service Deployment," International Conference on Communications '88, Jun. 12–15, 1988, IEEE Communications Society, Conference Record, Volume 3, pp. 1327–29.

Accordingly, any new node added to the AIN network to offer the enhanced announcement capabilities and other service features, through interactions with the central database, should not increase traffic on the interoffice signaling network and/or the network which carries signaling traffic between the database and the network switching systems, as in the prior art networks.

DISCLOSURE OF THE INVENTION

The present invention meets the above noted needs by providing a peripheral platform offering one or more auxiliary call processing features. This platform is connected to one or more switching systems and is in data communication with the service control point database. The platform may be a peripheral announcement platform, principally for sending synthesized voice messages and/or receiving dialed digit input information. In a more advanced implementation, the platform is an Intelligent Peripheral (IP) offering a wide array of enhanced auxiliary service features.

The services control point is essentially a central control for the network. In a preferred embodiment of the network, incorporating the peripheral platform, a first signalling communication system for two-way communications of data messages interconnects a number of central office switching systems and connects the central office switching systems to the services control point. A second signalling communication system provides two-way data signalling communications between the peripheral platform and the services control point. The second signalling communication system is separate from the first signalling communication system, the central office switching systems, and the trunk circuits interconnecting the central office switching systems. The second signalling communication system also permits exchange of messages between the peripheral platforms.

The network may also include a plurality of the peripheral platforms. One platform may connect to one switching system or to a number of the switching systems. Each such platform provides one or more auxiliary call processing capabilities in response to instructions from the services control point.

The combination of a plurality of peripheral platforms and a separate second signalling network permits exchange of messages between platforms, without the need to establish a call connection between the platforms through the switching systems and without adding excessive message traffic to the existing signalling network carrying information between the central office switching systems and between the central office switching systems and the services control point. For example, if the platforms offer a voice mail service or the like, a subscriber who is away from his home region could call in and access the peripheral platform servicing the area the subscriber is currently in. Typically, this would involve only a local call. The peripheral platform servicing the area the subscriber is currently in would access the subscriber's mailbox in the platform in the subscriber's home region. If the home region platform has stored any messages for play back to the subscriber, that platform would transmit the messages through the separate second signalling network to the platform servicing the area the subscriber is currently in. Upon receipt of the messages, that platform would provide playback to the subscriber over the local telephone connection.

Another aspect of the invention relates to precise methods for routing calls to the peripheral platform for service. In one method, a request for service might trigger a procedure for obtaining routing information from the services control point to direct a call to the peripheral platform. Alternatively, certain types of trigger events might cause the switching system to route calls to the peripheral platform directly, without accessing data stored by the database in the services control point.

Two specific architectures for the IP version of the peripheral platform are disclosed. One version uses general purpose computers with appropriate line interfaces. The software run by the computers offers a variety of different enhanced service features, such as voice mail, facsimile mail, voice recognition, etc. The second version includes a number of separate modules for specific identified service features, e.g. a voice mail server, a facsimile mail server, etc.

The ability of the IP to play announcements and collect input information, as either dialed digits (e.g. DTMF inputs) or speech, also provides an automated service platform for input of new service information or modified service information, directly from subscribers. For example, when a subscriber calls in to change service information, the SSP and ISCP route the call to the IP, and the IP executes a script to obtain the change information, in a manner quite similar to the call routing operations discussed above. After all necessary service change information has been received, the IP would forward the information to the ISCP and disconnect the call.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODES FOR CARRYING OUT THE INVENTION

Figure 1:
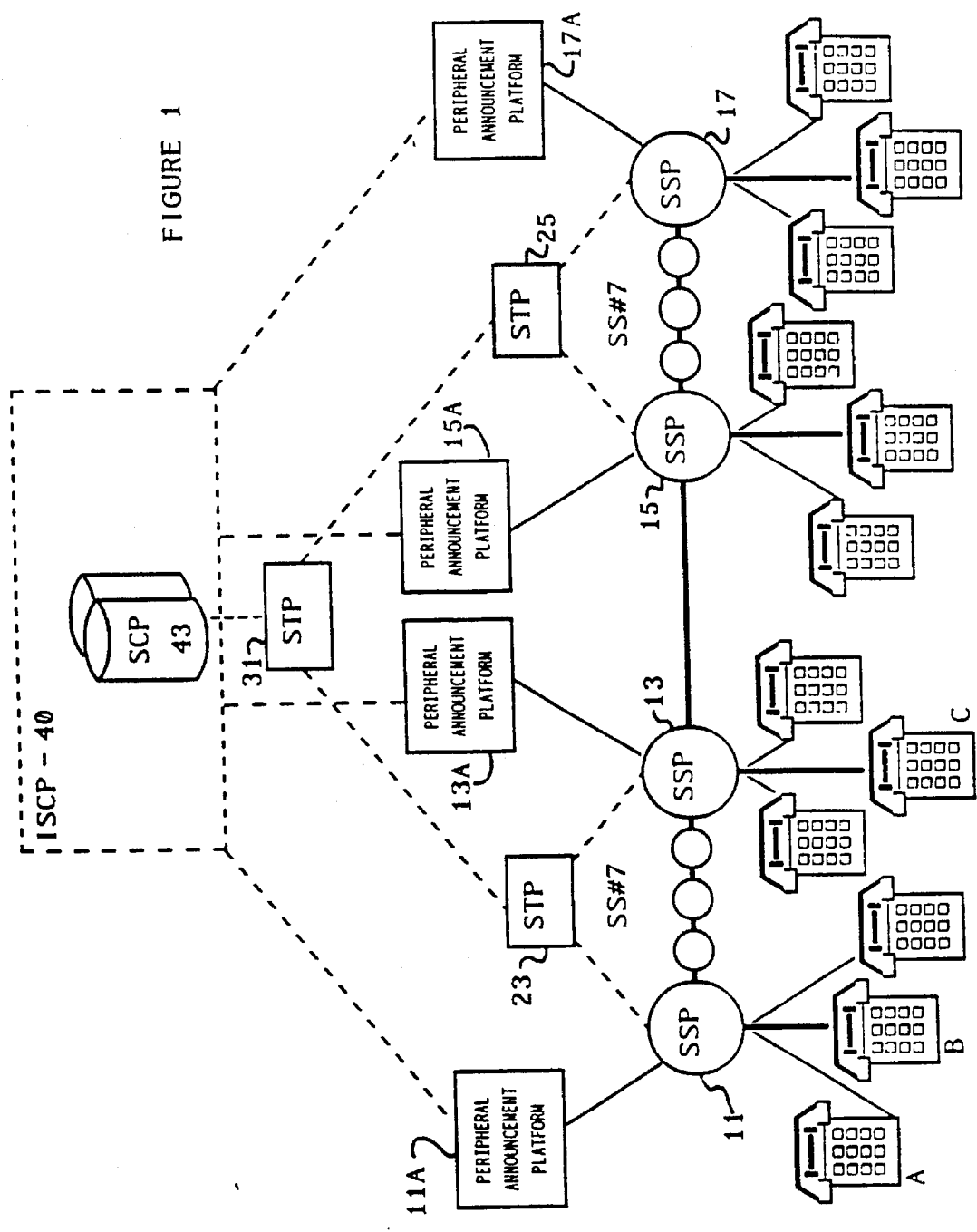
FIG. 1 is a schematic block diagram of an Advanced Intelligent Network architecture of a first preferred embodiment of the system for implementing the present invention.

In the first preferred embodiment of the Advanced Intelligent Network, shown in FIG. 1, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

As shown in FIG. 1, all of the end office switches 11, 13, 15 and 17 are equipped and programmed to serve as SSP's. The illustrated embodiment is perhaps an ideal implementation which would make a variety of Advance Intelligent Network AIN services widely available at the local office level throughout the network. Other AIN implementations provide the SSP functionality only at selected points in the network, and end offices without such functionality forward calls to one of the SSP's.

SSP capable central office switching systems typically consist of a programmable digital switch with CCIS communications capabilities. One example of an SSP capable CO switch is a 5ESS type switch manufactured by AT&T; but other vendors, such as Northern Telecom and Seimens, manufacture comparable digital switches which could serve as the SSP's. The structure of an exemplary CO which may serve as the SSP type CO's in the system of FIG. 1 will be discussed in more detail below, with regard to FIG. 2.

With reference to FIG. 1, the SSP type CO's 11 and 13 connect to a first local area STP 23, and the SSP-CO's 15 and 17 connect to a second local area STP 25. The connections to the STP's are for signalling purposes. As indicated by the circles below STP's 23 and 25, each local area STP can connect to a large number of the SSP-CO's. The central office SSP's are interconnected to each other by trunk circuits (illustrated in FIG. 1 as bold lines) for carrying telephone services.

The local area STP's 23 and 25, and any number of other such local area STP's (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSP's or not, may function primarily as tandem type offices providing connections between trunk circuits only.

The links between the central office switching systems (CO's) and the local area STP's 23 and 25 are typically SS#7 type CCIS interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

Figure 3:
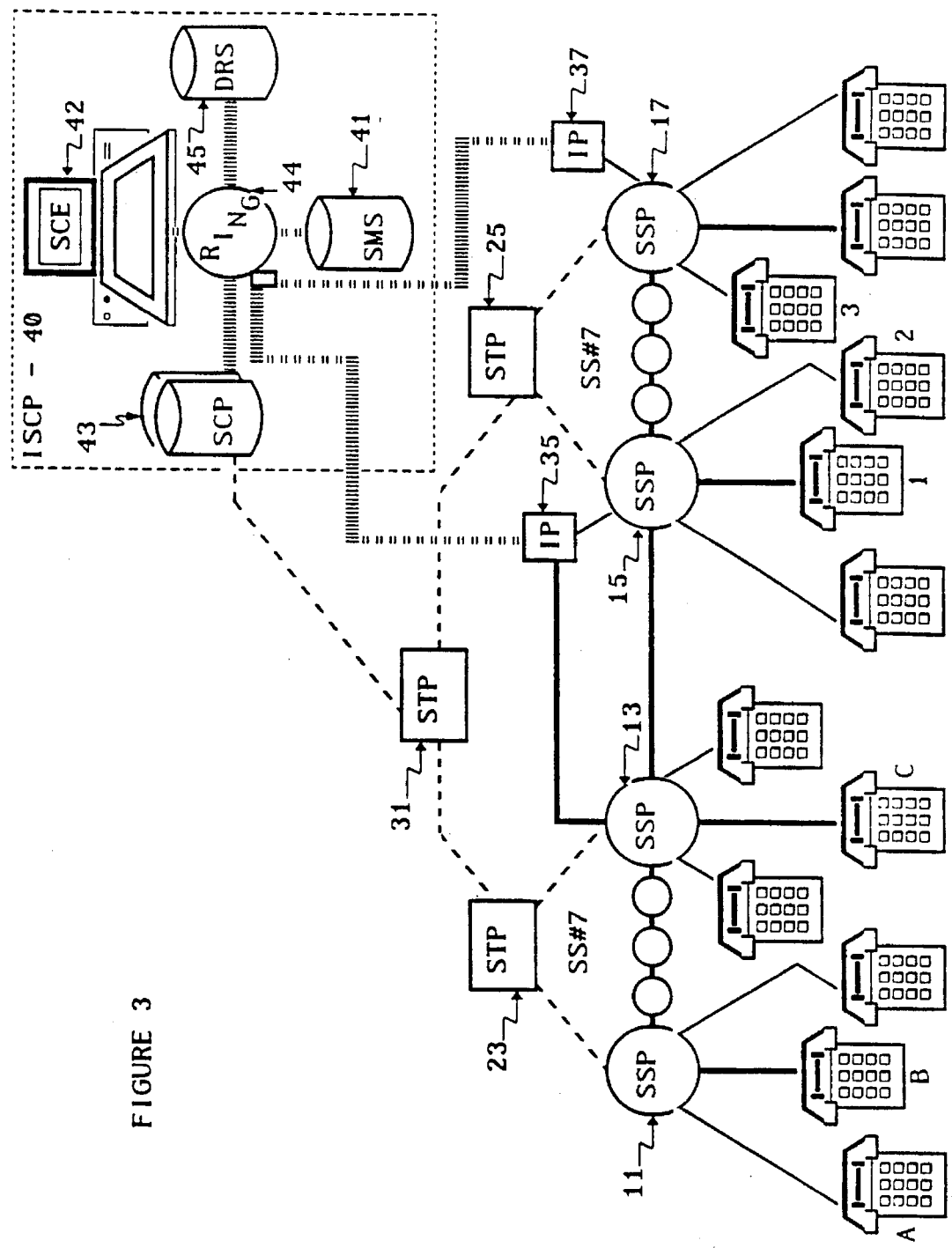
FIG. 3 is a schematic block diagram of an Advanced Intelligent Network architecture of a second preferred embodiment of the system for implementing the present invention.

The ISCP 40 is an integrated system shown in more detail in FIG. 3. Among other system components, the ISCP 40 includes a Service Management System (SMS), a Data and Reporting System (DRS) and the actual database referred to as a Service Control Point (SCP) 43. The ISCP also typically includes a terminal subsystem referred to as a Service Creation Environment or SCE for programming the database in the SCP 43 for the services subscribed to by each individual business customer. The components of the ISCP are connected by an internal, high-speed data network, such as a token ring network. For simplicity, only the SCP 43 is illustrated in FIG. 1.

Although shown as telephones in FIG. 1, the terminals can comprise any communication device compatible with the line. Where the line is a standard voice grade telephone line, for example, the terminals could include facsimile devices, modems etc.

Figure 2:
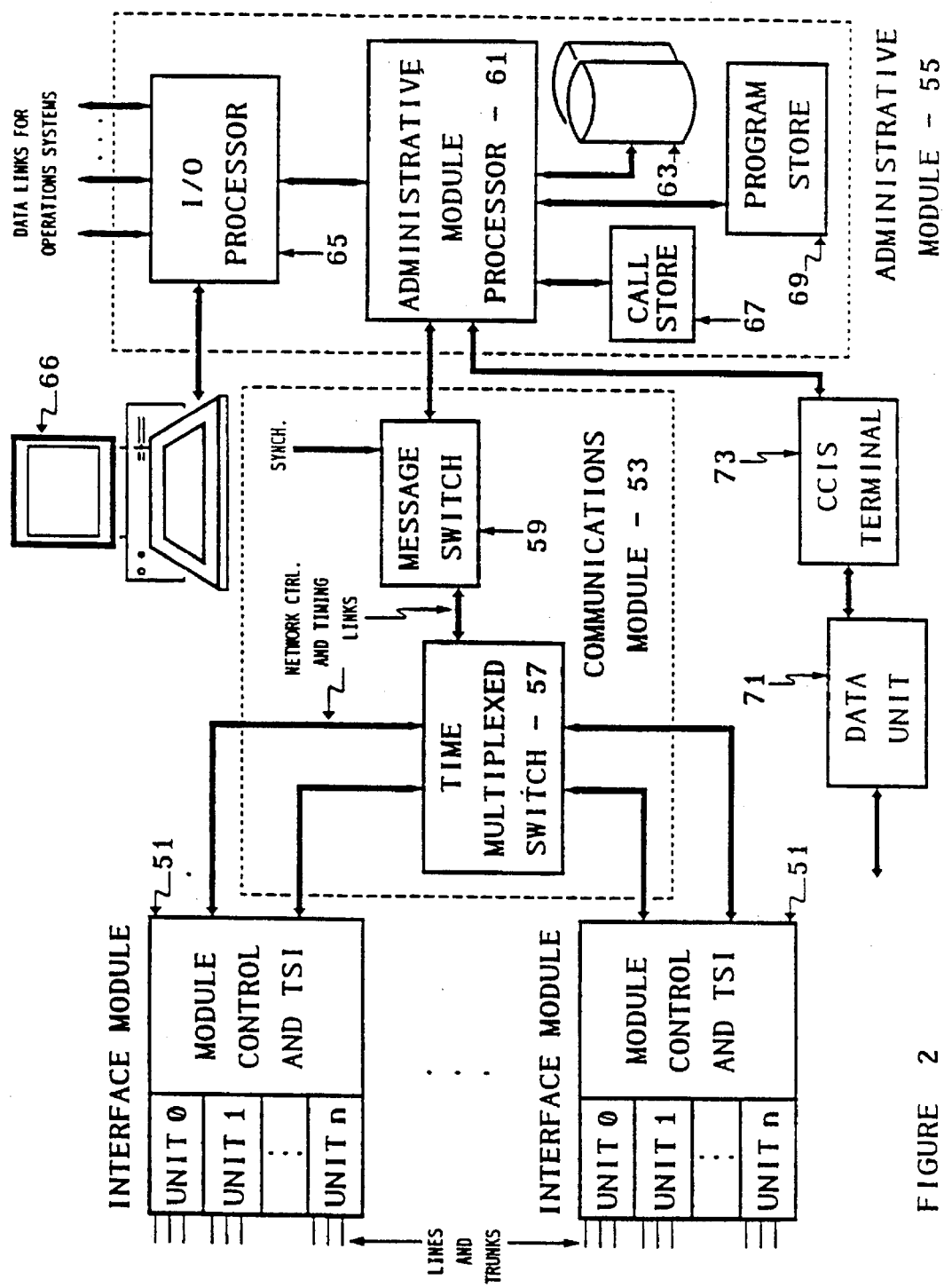
FIG. 2 is a more detailed diagram of one of the SSP type central offices used in the preferred intelligent network implementation of the present invention.

FIG. 2 is a simplified block diagram of an electronic program controlled switch which may be used as any one of the SSP type CO's in the system of FIG. 1. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like (see FIG. 1), for facilitating call processing signal communications with other CO's and with the ISCP 40.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

In accord with the present invention, one or more peripheral platforms are added to the network to provide one or more auxiliary call processing capabilities. As shown in FIG. 1, each of the SSP type central offices 11, 13, 15 and 17 connects to a peripheral announcement platform 11A, 13A, 15A and 17A, respectively. In the preferred embodiment, the peripheral announcement platforms each connect to the associated SSP switch via a primary rate Integrated Services Digital Network (ISDN) link through an appropriate interface unit in one of the interface modules 51 of the switch (see FIG. 2). The ISDN link carries both voice and signaling data. The peripheral announcement platforms also connect via a packet switched data communication network, such as X.25, to the ISCP. The X.25 data communication network forms a second signalling network separate from the SS#7 network and the network of trunk circuits interconnecting the switching offices.

In the simplest form, each peripheral announcement platform comprises a programmed system for receiving dialed digit information and synthesizing voice announcements in response to command data from the ISCP. For example, the peripheral announcement platforms might each include a personal computer with an X.25 interface and a text to speech type voice synthesizer and an ISDN interface. More sophisticated implementations of the peripheral platform, referred to as Intelligent Peripherals (IP's), provide a variety of additional call processing capabilities, as will be discussed in more detail below with regard to FIGS. 4A and 4B.

A central office switching system or CO shown in FIG. 1 normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP-CO 11 provides the call connection without any connection to another central office. When the called line connects to a distant station, for example when station A calls station C, the connection is made through the connected central office switching system SSP-CO 11 and at least one other central office switching system SSP-CO 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office; for example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between stations. In an AIN type network with peripheral platforms in accord with the present invention, these normal call processing routines would still be executed for completion of calls not requiring AIN processing or service features provided by the peripheral platform.

In an Advanced Intelligent Network (AIN) type system, such as shown in FIG. 1, certain calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signalling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by the peripheral platform, the call control message would instruct the SSP to route the call to the associated peripheral platform.

In the network of FIG. 1, the ISCP 40 transmits a "SEND to RESOURCE" type TCAP message instructing an SSP, such as SSP 17, to access a resource and collect digits. This message identifies a particular resource, in this case an ISDN type voice channel to the associated peripheral announcement platform 17A. Each time the ISCP sends such a "SEND to RESOURCE" message to an SSP, the ISCP concurrently sends a message through the X.25 data link to the associated peripheral announcement platform. This message tells the platform what message to play on the specified ISDN channel at that time. If the message announcement platform has a text-to-speech converter, the announcement could take the form of virtually any desired script.

The AIN network of FIG. 3 is essentially similar to that of FIG. 1, and like reference numerals have been used to indicate corresponding system components. The AIN of FIG. 3 differs from that of the earlier embodiment in that the ISCP is shown in more detail and the peripheral platforms take the form of more advanced platforms now referred to as "Intelligent Peripherals" or "IP's".

As shown in FIG. 3, the ISCP 40 includes a Service Management System (SMS) 41, a Data and Reporting System (DRS) 45 and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44.

The illustrated preferred embodiment includes two signalling communications systems carrying data to and from the ISCP 40. The communications links of the first such signalling network appear in the drawing as dashed lines, and the communications links of the second such signalling network appear in the drawing as lines formed by parallel bars. The first signalling network provides communications between the ISCP 40 and the SSP's 11, 13, 15, 17 and between the individual SSP's 11, 13, 15, 17. The second signalling network provides communications between the ISCP 40 and the IP's 35, 37. More specifically, the SCP 43 connects to the SSP's via the SS#7 network and the STP's 44. For the second signalling communication system a router shown as a small rectangle on the ring 44 provides a two-way communication connection to a data network, for example an Ethernet (IEEE 802.3) type local area network, another token ring, or a mixture of token ring and local area network, etc., going to the individual IP's 35, 37. The second signalling communication system uses a protocol referred to as a TCP/IP (Transmission Control Protocol/Internet Protocol) Other types of high speed data network can be used between the ISCP 40 and the IP's 35, 37. Typically, the second signalling network sill provide higher capacity data transport than the first signalling communication network.

One IP may connect to one SSP, similar to the system shown in FIG. 1. Alternatively, an IP may connect to two or more switching systems, or two or more IP's may connect to the same switching office. For example, in the network of FIG. 3, the IP 35 connects to two SSP type central office switching systems, 13, 15. The IP 37 connects to one SSP type central office switching system 17. The precise number of IP's in the network and the number thereof connected to different switching systems is determined by projected traffic demands for IP service features from the subscribers' lines connected to the various switching systems.

In the preferred embodiment, the connection from the IP to the SSP would utilize a primary rate ISDN type trunk line for carrying both voice channels and signaling information. However, a number of alternate implementations of this connection can be used. For example, the connection may take the form of a T1 circuit carrying a number of Multiplexed Centrex line channels. If additional data signalling is necessary from the switch to the IP, a Simplified Message Desk Interface (SMDI) link can be provided. SMDI is a standard form of maintenance port, available on many types of telephone switching systems, through which calling party number information can be supplied. For older switching systems not capable of call transfer through ISDN signalling or signalling on T1 Centrex lines, an additional switch could be added between the IP and the SSP.

The AIN topologies illustrated in FIGS. 1 and 3 are exemplary in nature, and other network topologies can be used. For example, the illustrated networks include SSP functionality in each of the end office switching systems. In some networks, at least some of the end offices may not have SSP capabilities. Each such end office would connect to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIGS. 1 and 3. In such networks, each peripheral announcement platform or IP could connect to one or more of the non-SSP end offices, one or more SSP capable end offices and/or to the SSP capable tandem. The SSP capable tandem office switch is a digital switch, such as the 5ESS switch from AT&T; and the non-SSP type end offices might be 1A analog type switches.

Figure 4A:
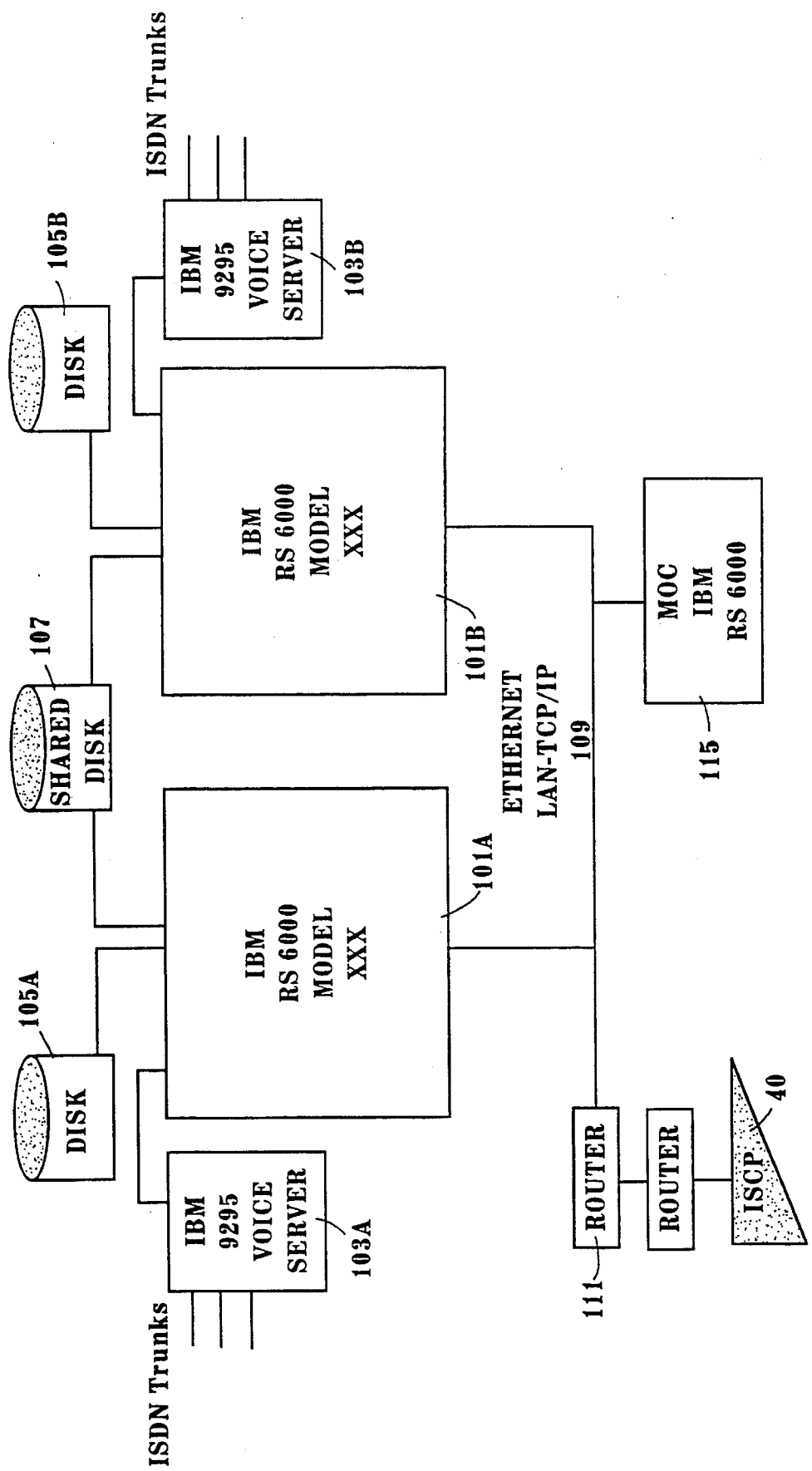
FIG. 4A is a schematic block diagram of one embodiment of an intelligent peripheral for use in the present invention.

FIG. 4A illustrates a first, preferred embodiment of the IP used in the network of FIG. 3. In this implementation, the IP will consist of two or more general purpose computers 101A, 101B, such as IBM RS-6000's. Each general purpose computer will include a digital voice processing card for sending and receiving speech and other audio frequency signals, such as an IBM D-talk 600. Each voice processing card will connect to a voice server card 103A or 103B which provides the actual interface to T1 or primary rate interface ISDN trunks to the SSP type switching office. The plurality of computers may have associated dedicated disk storage 105A, 105B, and the IP will included a shared disk memory 107. Each computer will also include an interface card for providing two-way communications over an internal data communications system, an Ethernet type local area network 109. The Ethernet carries communications between the individual computers and between the computers and a router which provides an interconnection to the second signalling communications network going to the ISCP. The IP may also include another general purpose computer 115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 101A, 101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

Figure 4B:
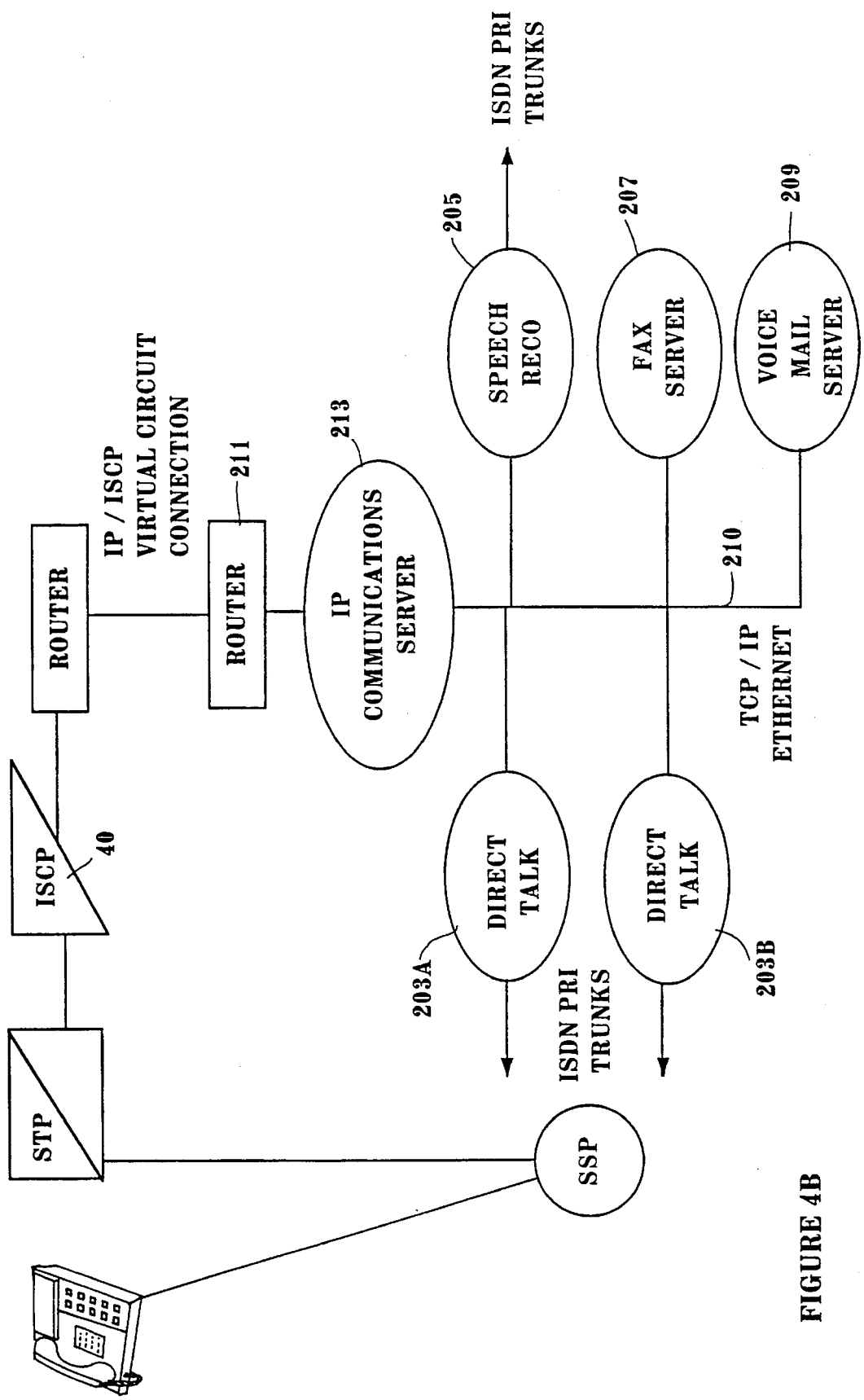
FIG. 4B is a schematic block diagram of an alternate embodiment of an intelligent peripheral for use in the present invention.

FIG. 4B illustrates an alternate embodiment of the IP used in the network of FIG. 3. The alternate architecture utilizes separate modules for different types of services or functions, for example, one or two Direct Talk type voice server modules 203A, 203B for interfacing the trunk to the SSP, a separate module 205 for speech recognition, a server module 209 for voice mail, and another server 207 for fax mail services, etc. The various modules communicate with one another via an data communication system 210, which again may be an Ethernet type local area network.

The Direct Talk modules 203A, 203B provide voice message transmission and dialed digit collection capabilities, as in the earlier embodiment. The modules 203A, 203B also provide line interfaces for communications to and from those servers which do not incorporate line interfaces. For example, for facsimile mail, the Direct Talk module connected to a call would demodulate incoming data and convert the data to a digital format compatible with the internal data communication network 210. The data would then be transferred over network 210 to the fax server 207. For outgoing facsimile transmission, the server 207 would transfer the data to one of the Direct Talk modules over the network 210. The Direct Talk module would reformat and/or modulate the data as appropriate for transmission over the ISDN link to the SSP. The Direct Talk modules provide a similar interface function for the other servers, such as the voice mail server 209.

The illustrated IP also includes a communication server 213. The communication server 213 connects between the data communication system 210 and the router 211 which provides communications access to the second signalling communication system and the ISCP 40 and other IP's which connect to that signalling communication system. The communication server 213 controls communications between the modules within the IP and the second signalling communication system.

In each of the proposed architectures, the SSP switch would route calls to the different elements of the IP in response to instructions from the ISCP. In the initial implementation using general purpose computers (FIG. 4A), each of which offers all service functionalities, the decision to route to a particular one of the computers would be a resource availability/allocation decision. If necessary data can be exchanged between the computers via the internal data communications network, e.g. if a message for a particular subscriber's service is stored in the disc memory associated with one computer but the other computer is actually processing the call. In the second implementation (FIG. 4B), however, the ISCP would instruct the SSP to route the call to the particular line to the specific module capable of providing a calling customer's individual service. For example, if the subscriber has some form of speech recognition service, the call would be routed to the speech recognition module 205. If the subscriber has a voice mail service, however, the ISCP would instruct the SSP to route the call to one of the lines going to one of the voice server modules 203A, 203B. The module 203A, or 203B would receive outgoing voice messages from the voice mail server 209 for transmission to the caller. The module 203A or 203B would decode DTMF signals and supply appropriate data to the voice mail server, for control purposes. The module 203A or 203B would also format incoming voice messages for transmission over internal network 210 and storage by server 209.

Using a proprietary protocol +1129 developed for this project, the IP will query ISCP in response to a call. Thus, during a call, a trigger event occurs. The SSP queries the ISCP which responds by instructing the SSP to route the call to the IP, using standard TCAP protocol messages. Using the +1129 protocol, when the SSP routes the call to the IP, then the IP queries the ISCP and receives one or a sequence of instructions as to how to process the particular call. The message set defined by this protocol is as follows:

ProvideInstructions—message sent by the IP to ask ISCP software for information on handling a call. Begins a transaction and provides necessary information to start the appropriate MSAP script.

CallInfoToResource—sent by ISCP software to the IP to inform it to play messages to the caller and/or collect and return digits entered by the caller. May inform the IP to terminate the call.

CallInfoFromResource—message sent by the IP in response to the preceding CallInfoToResource message. Includes result code and collected digits.

SwitchInfoToResource—message sent by ISCP software to provide the IP with the information it needs to transfer the call elsewhere. This message and the following one are not part of TA-NWT-001129.

SwitchInfoFromResource—message sent by the IP or ISCP software with the result of the preceding SwitchInfoToResource.

ResourceClear—message may be sent by the IP in response to a preceding CallInfoToResource if that preceding message requested that the call be terminated. Also, may be sent by the IP asynchronously to alert ISCP software that the call was terminated by the customer. This message includes a parameter describing the "cause" for terminating the call.

CancelResourceEvent—message sent asynchronously by ISCP software to terminate the conversation. Implies abnormal termination. Normally CallInfoToResource is used to terminate a call.

ExtendedInfoToResource—message sent by ISCP software to the IP to provide a standard format for extending the message set above. In this specification, it is used to extend the message set to include the Play Application with information message.

ExtendedFromToResource—message sent by the IP to ISCP software in response to the ExtendedInfoToResource message above.

A modified protocol specified in Bellcore TA-NWT-001129 includes a similar but somewhat smaller message set which may be used for communications between an ISCP and an SSP as an enhancement over the standard TCAP message set.

As an alternative or in addition to the +1129 protocol, communications between the IP and the ISCP may utilize generic data interface (GDI). The GDI command set is simpler and more generic, and the commands can carry more data. Also, the ISCP can initiate communications using GDI. This permits a wider variety of routing and processing routines. In response to a triggering event, the SSP would again receive instructions to route a call in progress to the IP. However, rather than waiting for a subsequent query from the IP, while the SSP is routing the call the ISCP could instruct the IP to prepare to receive a call on a particular circuit. For example, for a call which might require speech recognition processing, the ISCP would instruct the IP to retrieve appropriate recognition templates from memory. Other protocols could be used to permit either the ISCP or the IP to initiate communications.

Figure 5:
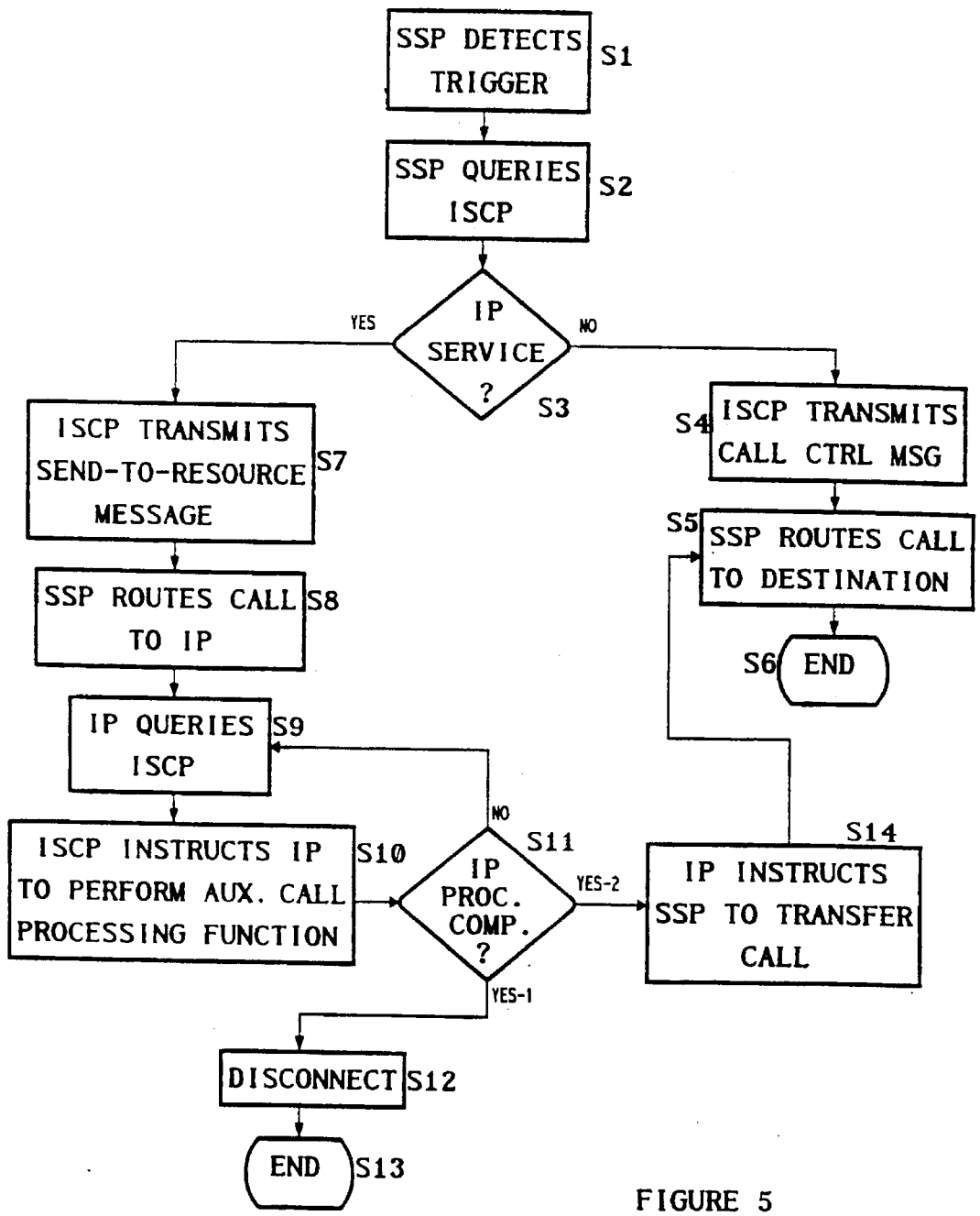
FIG. 5 is a simplified flow chart diagramming a first mode of operation of an advanced intelligent network, utilizing one or more peripheral platforms, in accord with the present invention.

The flow chart of FIG. 5 depicts a first mode of operation in accord with the present invention, wherein an AIN type query and response communication procedure between the SSP and the ISCP is used to route appropriate calls to the IP. As noted above, calls requiring some form of AIN service processing will include an event detectable as a trigger. This might be an off-hook on a line for a subscriber to a speech recognition dialing service. As another example, for a call-block service on calls to a particular subscriber, the triggering event would be the dialing of that subscriber's telephone number. This later type of trigger may take the form of a dialed number trigger set in the SSP servicing the caller, or this trigger may be set as a destination number trigger in the SSP serving the called subscriber. A variety of other triggers are known, and a particular trigger is set up in the SSP(s) as needed to effectuate each particular AIN service. For simplicity, the processing illustrated in FIG. 5 begins at some point during call processing when an SSP detects some event identified as a trigger (S1).

In response to trigger detection, the SSP queries the ISCP for further instructions (S2). More specifically, the SSP type central office (CO) suspends the call and sends a query message to the ISCP via one or more STP's (see FIG. 1 or FIG. 3). This query message is in the above described TCAP format for an initial query from an SSP. The query message includes a substantial amount of relevant information, such as the dialed digits and the identification of the telephone line from which the party originated the present call. The originating SSP sends the TCAP query via a CCIS link to an STP. The STP recognizes that the TCAP query is addressed to the ISCP and retransmits the query, either directly or through a further STP, and the SS#7 links to the ISCP.

The ISCP 40 uses information contained in the TCAP query message to access data tables stored in the SCP database 43. The ISCP uses data from the retrieved tables to translate the information from the TCAP query into an appropriate instruction for the SSP. At this point, the instruction will take a different form depending on whether or not the relevant AIN service requires some processing feature provided by the IP. If the service does not call for an IP feature, processing branches from step S3 to step S4, wherein the ISCP transmits a call control message to the SSP via the STP's of the SS#7 signalling network. In the simplified example here, it is assumed that the non-IP type service involves only a direct routing to a destination, without any further processing by the SSP. The message from the ISCP, in TCAP format, therefore specifies an actual destination number and provides any necessary associated routing instructions, such as a preferred trunk group identification, from the data tables. At step S5, the SSP executes normal call processing routines for completing the call using the destination telephone number and/or routing information received from the ISCP, and call processing ends at step S6.

Returning to step S3, if the service identified in response to the information in the original TCAP query message requires one or more call processing functions of the IP, processing branches to step S7. At this point, the ISCP transmits a "SENDTORESOURCES" type TCAP message or a similar message from the 1129 protocol back to the SSP via the STP's of the SS#7 signalling network. This message would include sufficient information to route the call to one of the lines going to a voice server interface 103A or 103B within the IP. If the IP connects directly to the SSP, the SSP simply activates appropriate internal switching elements to establish the call connection channel between the caller and the IP. If the IP does not connect to the particular SSP, the instruction will provide sufficient information to route the call through other switching systems to the IP.

When the IP receives the call, the SSP will provide the IP with a substantial amount of information about the particular call, including the dialed digits and the calling party's telephone number. In response to the call, the IP will formulate a query message containing this information. The IP will transmit this query message to the ISCP via the second signalling communication network (S9). The ISCP will utilize the information from the IP query message to access the stored data tables in the SCP database 43, formulate an appropriate instruction and transmit that instruction back to the IP via the second signalling communication network. For example, in a call blocking type service requiring a caller to input a PIN number in order to reach a called subscriber, the instruction might identify a prompting message and specify a number of digits to be collected. The IP would receive the message and perform the call processing function specified in the instruction (S10).

At this point processing by the IP may be complete, or further interaction with the ISCP may be necessary to determine how to dispose of the call. A branch therefore appears in the call processing at step S11. If further processing is necessary, the IP will again communicate with the ISCP by transmitting a message, which may be another query, up to the ISCP through the second signalling communication network (S9).

In the present call blocking example, the IP function in step S10 would involve would retrieval of the identified message from memory and provision of that message to the digital voice card. The digital voice card would synthesize appropriate speech signals for transmission through the voice server card 103A or 103B and the voice network to the caller. This voice message might say "Jane Smith does not wish to be disturbed at this time. If you wish to leave a message please stay on the line." Callers familiar with Ms. Smith would know that this blocking feature could be overridden by input of a personal identification number (PIN) which Ms. Smith had given them. The IP would wait a specified time period and would collect any dialed digits received during from the caller during that period. At step S11, processing would not be complete and would branch to step S9. The IP would formulate a query or other format message including any dialed digits received or information indicating a lack of receipt of digits and transmit that data message back up to the ISCP through the second signalling communication system.

The ISCP will utilize the information from the latest IP query message to again access the stored data tables in the SCP database 43, formulate an appropriate instruction for further processing and transmit that instruction back to the IP via the second signalling communication network. The loop formed by steps S9 to S11 will continue in this manner until IP processing is complete. Continuing with the call blocking example, the ISCP would identify whether or not a correct PIN was dialed in by the caller. If not, the next message to the IP would instruct the IP to execute a voice mail box script for the called subscriber. The IP would play an outgoing message and record an incoming message to the caller. After completion of the mailbox script, IP processing would be complete. At step S11, process flow would branch to the "Yes-1" alternative, and the IP would disconnect the call (S12) and processing would end (S13).

Not all processing by the IP ends in a simple disconnect. Other alternative call dispositions are possible. The most common, illustrated in FIG. 5, is that after all other processing the IP will instruct the SSP to transfer the call to a specified destination (S14). In such a case, the message transmitted from the ISCP to the IP as part of step S10 would specify an actual destination number. In the call blocking example, if the ISCP determined that the caller had dialed in a valid PIN, the ISCP would transmit the telephone number for Jane Smith's current location. When processing branches to step S14, the IP will request call transfer by the SSP and supply the destination number to the SSP. For example, if the link to the SSP uses ISDN, the IP would transmit a transfer request and the destination digits over the D-channel. As an alternate example, if the link is T1 carrying multiplexed Centrex lines, the IP would simulate a hookflash on the line or channel carrying the call and then outpulse the digits of the destination number.

In response to the transfer request, the SSP routes the call to the destination (S5) and tears down the prior call connection between the caller and the IP. Call processing again ends at step S6.

Figure 6:
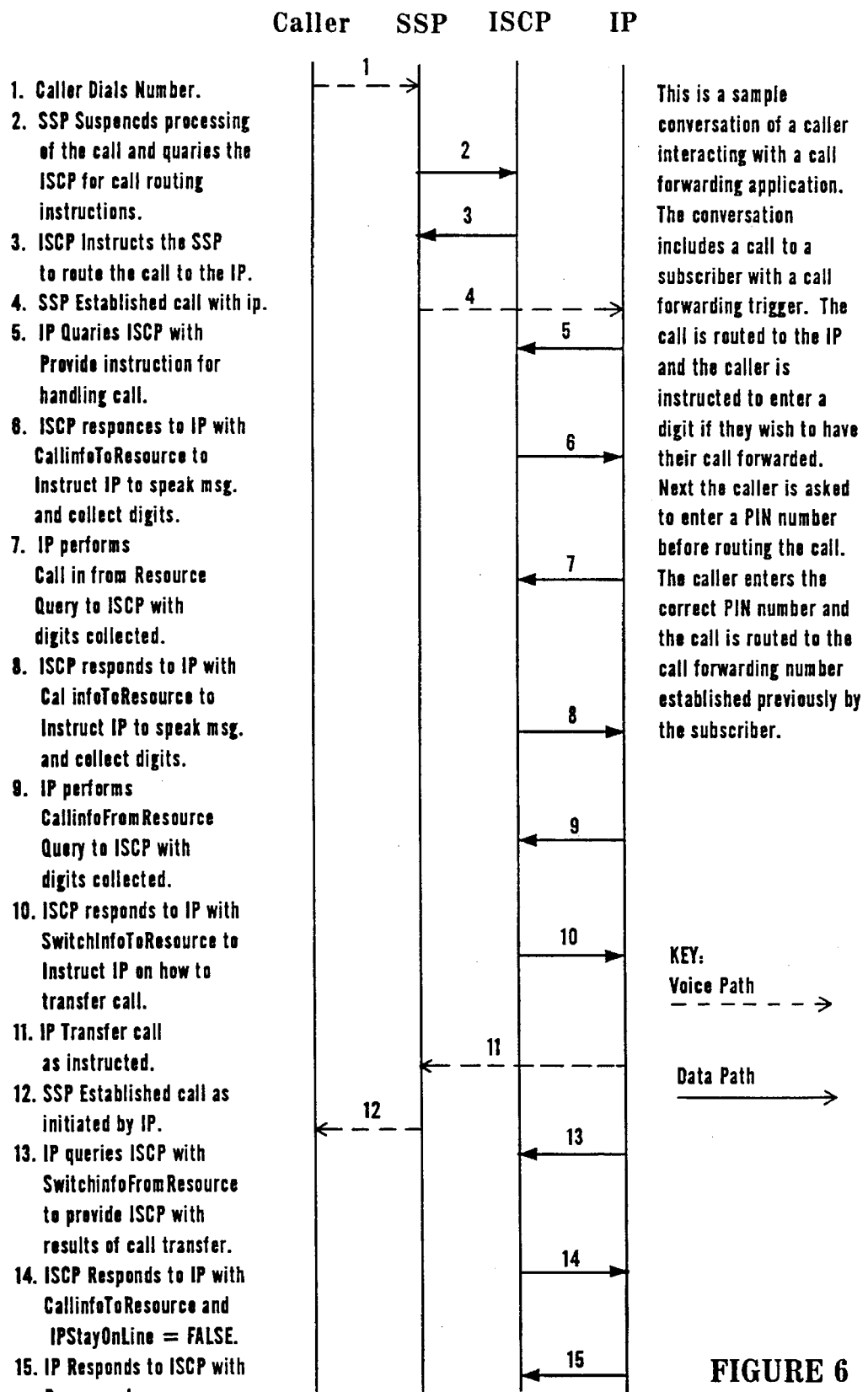
FIG. 6 illustrates in more detail the exchange of messages between network elements and operations performed, in an exemplary call forwarding service.

FIG. 6 illustrates in more detail the exchange of messages between network elements and operations performed, in an exemplary call forwarding service with a PIN number screening feature, utilizing the method of operation of FIG. 5. The illustrated example uses specific messages from the +1129 protocol.

Figure 7:
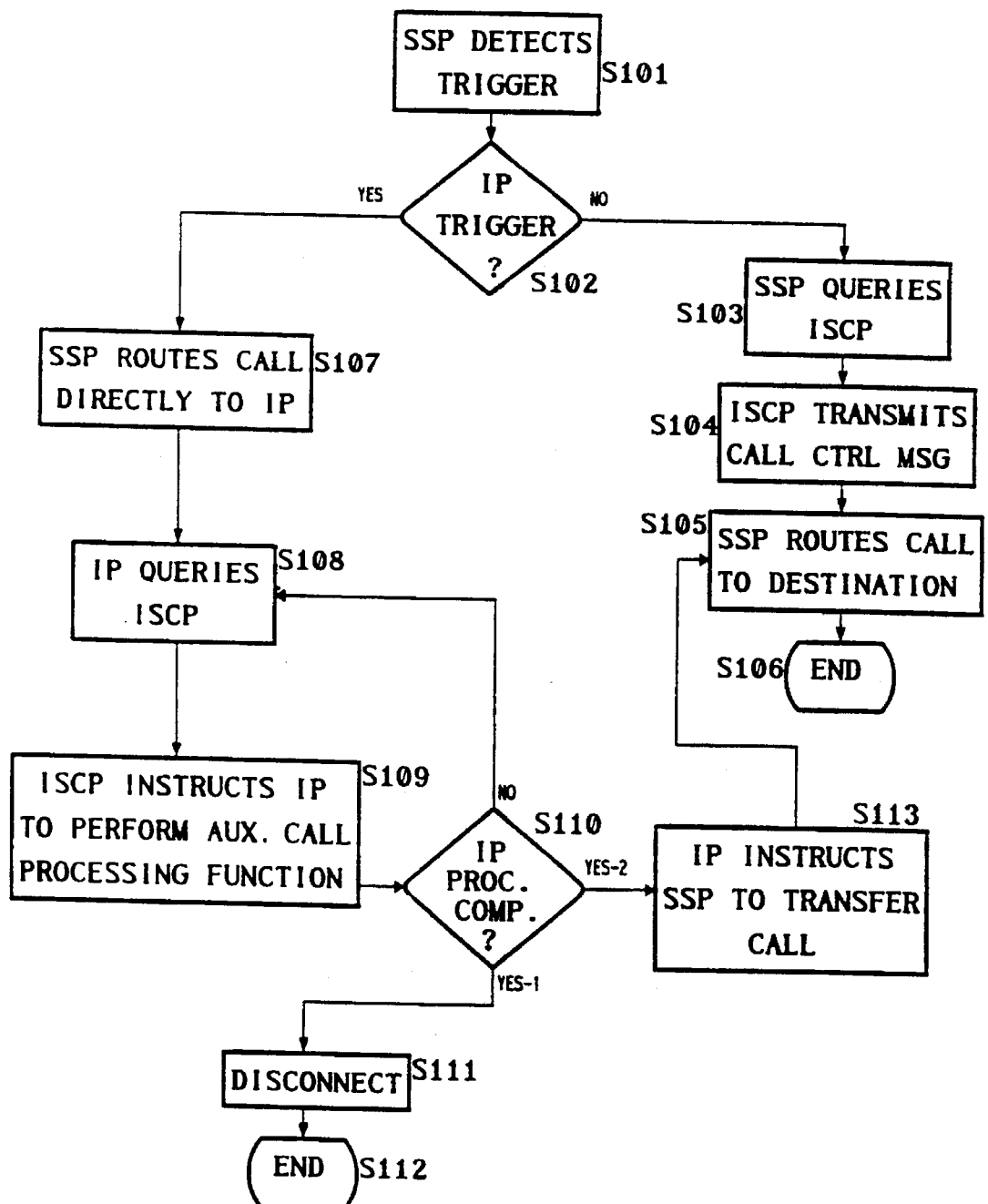
FIG. 7 is a simplified flow chart diagramming a second mode of operation of an advanced intelligent network, utilizing one or more peripheral platforms, in accord with the present invention.

The flow chart of FIG. 7 depicts a second mode of operation in accord with the present invention. As in the earlier method of operation, the relevant portion of the call processing begins when the SSP detects some call related event as a trigger (S101). In this second embodiment, however, not all triggering events trigger communication with the ISCP. Some triggering events activate direct routing to the IP. More specifically, the SSP will still recognize triggers for initiating communication with the ISCP in the normal manner. In addition, the translation tables stored in disc memory 63 within the administrative module 55 will provide data, such that in response to certain triggers, the SSP can establish a call communication connection between the caller and the IP, without first querying the ISCP. Thus, in FIG. 7, step S102 illustrates a branching in the process flow based on whether or not the trigger indicates need for routing to the IP. If not an IP trigger, call processing branches to step S103, wherein the SSP transmits a TCAP query to the ISCP. In response, the ISCP accesses the data tables in the SCP database 43 and formulates an appropriate response message for transmission back to the SSP. In the illustrated example (S104) the message is a call control message, in TCAP format specifying a destination telephone number and additional routing information as needed. The SSP uses the routing information and destination number to route the call through the network in essentially the manner discussed above (S105), and the call processing ends at step S106.

The example of call processing shown in steps S103 to S106 assumes, for simplicity that the service involves only direct routing to a destination. A wide variety of other AIN services, with more complicated call processing routines and multiple communications between the SSP and the ISCP could be used here to provide subscribers a wide array of services. Also, some of the AIN services which start in response to a non-IP trigger may still require some IP features under certain circumstances. If IP services become necessary, one of the ISCP instructions to the SSP would result in routing to the IP and further processing similar to that discussed above with regard to FIG. 5.

Returning to step S102 in FIG. 7, if at that point the triggering event corresponds to an IP service, call processing branches to step S107. In that step, the SSP uses the information retrieved from its internal translation tables to route the call to an IP. The IP may be directly connected to the SSP, or the SSP may route the call through one or more switching systems to reach the IP. The IP utilizes call related data received from the SSP to formulate an initial query and transmits that query to the ISCP through the second signalling communication network (S108). The ISCP will utilize the information from the initial IP query message to access the stored data tables in the SCP database 43, formulate an appropriate instruction and transmit that instruction back to the IP via the second signalling communication network. The IP receives the message and performs the call processing function specified in the instruction from the ISCP (S109). If further processing is needed (S110), processing flows back to step S108 for a further transmission to the ISCP. The steps S108, S109 and S110 form a processing loop for successive interactions between the IP and the ISCP to control the IP to perform a series of service features or operations in accord with data from the tables stored in the SCP database. This loop operates in essentially the same manner as the loop formed by steps S9, S10 and S11 of FIG. 5.

The loop processing will continue until no further processing by the IP is required. Several different types of call processing may follow completion of the IP operations, two of which are illustrated in the drawing. One outcome, when no further processing of the call at all is necessary, for example at the end of a facsimile mail transmission, results in a disconnect (S111), and processing ends at step S112. Other types of services, such as access to a restricted class of service following entry of a valid PIN, result in further routing of the call. In such cases, the IP will instruct the SSP to transfer the call to a destination specified in one of the instructions from the ISCP (S113) and may provide additional routing control instructions, in one of the manners discussed above. In response to the transfer request, the SSP routes the call to the destination (S105) and tears down the prior call connection between the caller and the IP. Call processing again ends at step S106.

Typically, a single IP will service up to five or six SSP type switching offices. The second signalling communication network will permit exchanges of data between IP's. For example, in voice mail or fax mail applications, messages from a subscriber's mailbox in a home IP can be transferred via the second signalling network to a remote IP serving an area from which a roaming subscriber calls in. This eliminates the need for a voice trunk connection between the subscriber's current location and the subscriber's home IP to permit the subscriber to retrieve messages while away from home. The subscriber would only need to make a local call to the IP serving the area the subscriber is calling from.

One major use for the peripheral platform, in each implementation, relates to provisioning and/or modifying services. The peripheral platform would provide prompts and receive DTMF or speech inputs from subscribers and store service control data and personalized messages, for subsequent use in providing the subscribers' individualized services, as discussed in more detail below.

Typically, a subscriber's service is initially set up by a telephone company technician using the Service Creation Environment or SCE 42 in the ISCP 40. As part of this procedure, the technician establishes one or more data tables for the subscriber in the SCP 43. The format of the data tables would be defined by the types of data needed to control the service in the manner selected by the particular subscriber. Any control data which the subscriber wants to apply as fixed data to all calls would also be input by the technician using the SCE 42. Subsequently, the subscriber would actually control the service by inputting data to populate the subscriber's data table(s) through an interaction with the peripheral platform. The newly input control data is transferred from the peripheral platform to the ISCP for storage. If the particular service requires a stored voice message, such as a personalized greeting, that message would be stored in the peripheral platform.

One specific implementation for receiving inputs from the subscriber uses an interactive voice and DTMF input type access procedure. The subscriber would dial a specified number to initiate programming, for example a seven digit number such as 550-0211. The call could be routed through the network to a line connected to the peripheral announcement platform or the IP, in one of the ways discussed above with regard to FIGS. 5 and 7. The particular peripheral platform would provide synthesized speech prompts and accept DTMF inputs, in response to instructions from the ISCP, to allow the subscriber to enter the service data, such as a new forwarding number or a new PIN number. The subscriber might also be prompted to record a greeting, if appropriate.

Using the 1129+ protocol for communications between the IP and the ISCP, the IP would query the ISCP, and the ISCP would return an instruction for each operation to be performed by the IP. For example, the IP would send a query, the ISCP would instruct the IP to play a specified prompt message and collect digits, e.g. for a new PIN number. The IP would play the message, collect the digits and return the digits to the ISCP. If further input was necessary, the ISCP would return another message requesting input of additional information, e.g. to confirm the input PIN number. This routine would continue until processing by the IP was complete.

Using the more generic form of communications between the IP and the ISCP, the ISCP might initiate the communications and larger quantities of data can be exchanged with each message. This capability might be used to instruct the IP to play a specific detailed script type application, e.g. for input of a long series of data inputs and/or associated personalized messages to set up and more complex service. Assume for example, that the script called for an Interactive Voice Response (IVR) routine to input one or PIN numbers, an initial greeting for use as a prompt to request PIN number input and a second message for playback when a caller fails to input the correct PIN. The IP would store a script for conducting a customized interactive input procedure for each particular subscriber, in the example for prompting and receiving the PIN digits and messages. When the subscriber dials the specified number to initiate programming, the call is routed through the network to the IP in the usual manner. Concurrently, the ISCP sends an initial message informing the IP of the incoming call and the need to retrieve the data necessary to play the particular service modification script.

The IP unit would provide customized synthesized speech prompts and accept DTMF inputs to execute an authorization procedure and then allow the authorized subscriber to selectively enter one or more new PIN numbers, and store new voice messages. The IP might also use its synthesized speech messaging facilities to provide confirmation messages repeating back the received data and requesting dialing of a confirmation code, such as depression of the '#' key.

Through either of the above discussed interactive procedures, the IP will collect all necessary information from the subscriber, after which the subscriber hangs up. The IP will then transfer data, as necessary to the IP, for example the newly input PIN number through the second signalling network. The ISCP will verify received data inputs from the subscriber to insure that they meet the requirements for controlling the particular subscriber's call processing routine, and if the inputs are valid, the ISCP stores the received data in the subscriber's files. If errors are found, for example if the caller entered only seven digits at a point where eight were expected, the ISCP could provide an error message, and the peripheral platform would prompt again for input of the relevant data.

Use of the IP may also offer several alternatives for receiving subscriber inputs and transferring input data for storage in the SCP database 43. Different subscribers may access the system using different means, and/or one subscriber may access the database one way one time and a different way at other times. For example, instead of using DTMF dialed digit inputs, the speech recognition software in the IP might permit the caller to speak in input data, such as numbers for call redirection. The IP might also be programmed to send and receive data through the telephone network, and thereby permit subscriber's to access the system from a screen based telephone and/or a modem and personal computer arrangement.

Although several preferred embodiments of the invention have been described in detail above, it should be clear that the present invention is capable of numerous modifications as would be apparent to one of ordinary skill in the art. Such modifications fall within the purview of the appended claims.

We claim:

1. A communication network, comprising:

local communication lines;

a plurality of separately located central office switching systems interconnected via trunk circuits for selectively providing switched call connections between at least two of the local communication lines;

a services control point, separate from the central office switching systems, comprising a database storing call processing data associated with a plurality of the local communication lines for control of call processing through one or more of the central office switching systems;

a first signalling communication system for two-way communications of data messages, said first signalling communication system interconnecting the central office switching systems and connecting the central office switching systems to the services control point;

a peripheral platform connected to at least one of the central office switching systems via a call connection channel, said peripheral platform comprising means for providing at least one auxiliary call processing capability via the call connection channel; and a second signalling communication system, separate from the first signalling communication system and the central office switching systems, for providing two-way communications of data messages between the peripheral platform and the services control point to control provision of the at least one call processing capability by the peripheral platform.

2. A network as in claim 1, wherein said services control point further comprises a service management system, a data and reporting system for capturing and storing a data record of calls processed by accessing the database, a service creation environment terminal subsystem for programming the database, and an internal data communication system interconnecting said database, said service management system, said data and reporting system and said service creation environment.

3. A network as in claim 2, wherein said internal data communication system comprises a token ring.

4. A network as in claim 2, wherein said services control point further comprises a router connected to said internal data communication system for two way data communication with said second signalling communication system.

5. A network as in claim 1, wherein said local communication lines comprise telephone lines, and said central office switching systems comprise telephone switches.

6. A network as in claim 1, wherein said peripheral platform comprises means for transmitting voice messages and receiving dialed digit signals.

7. A network as in claim 1, wherein said peripheral platform comprises means for processing voice messages and dual-tone multifrequency signals, at least one server for providing an auxiliary call processing capability, an interface to the second signalling communication system, and an internal data communication system carrying information between said processing means, said server and said interface.

8. A network as in claim 1, wherein said first signalling communication system is a common channel interoffice signalling network.

9. A network as in claim 8, wherein said second signalling communication system is an X.25 network.

10. A network as in claim 8, wherein said second signalling communication system is a TCP/IP network.

11. A network as in claim 8, wherein said second signalling communication system is a local area network.

12. A network as in claim 11, wherein the local area network is an Ethernet.

13. A network as in claim 8, wherein said local communication lines comprise telephone lines, and said central office switching systems comprise telephone switches interconnected to each other by voice telephone type trunk circuits separate from said common channel interoffice signaling system.

14. A network as in claim 8, wherein said second signalling communication system is a token ring network.

15. A network as in claim 1, wherein said peripheral platform comprises a plurality of digital line interface circuits each coupled to send and receive signals over a digital call connection channel to the at least one central office switching system, a plurality of processors each for sending and receiving information through one of the digital line interface circuits, an interface to the second signalling communication system, and an internal data communication system carrying information between said plurality of processors and said interface.

16. A network as in claim 15, wherein said peripheral platform further comprises a message storage means, accessible by at least one of said plurality of processors, for storing and retrieving messages therefrom each of which has been received through or will be transmitted through one of said digital line interface circuits.

17. A communication network, comprising: local communication lines;
a plurality of separately located central office switching systems interconnected via trunk circuits for selectively providing switched call connections between at least two of the local communication lines;
a services control point, separate from the central office switching systems, comprising a database storing call processing data associated with a plurality of the local communication lines for control of call processing through one or more of the central office switching systems;
at least two peripheral platforms, each of which connects to at least one of the central office switching systems via a call connection channel, each of said at least two peripheral platforms comprising means for providing auxiliary call processing capabilities in response to instructions from said services control point; and
a signalling communication system separate from said trunk circuits for two-way communications of data messages between the central office switching systems, between the central office switching systems and the services control point, between the at least two peripheral platforms and between the at least two peripheral platforms and the services control point.

18. A network as in claim 17, wherein said signalling communication system comprises:
a first signalling communication network for two-way communications of data messages, said first signalling communication network interconnecting the central office switching systems and connecting the central office switching systems to the services control point;
a second signalling communication network, separate from the first signalling communication network and the central office switching systems, for providing two-way communications of data messages between the at least two peripheral platforms and between the at least two peripheral platforms and the services control point.

19. A network as in claim 17, wherein each of said peripheral platforms comprises:
a message storage means for storing and retrieving messages therefrom each of which has been received through or will be transmitted through a call connection channel; and
an internal data communication system connected to said second signalling network to permit communications with said services control point and transfer of stored messages from the message storage means in one peripheral platform to the message storage means in another of the peripheral platforms.

20. A network as in claim 17, wherein said message storage means comprises a digital voice message storage and retrieval system.

21. A network as in claim 17, wherein said message storage means comprises a facsimile message storage and retrieval system.

22. A network as in claim 17, wherein said peripheral platform comprises means for processing voice messages and dual-tone multifrequency signals, at least one server for providing an auxiliary call processing capability, an interface to the second signalling communication system, and an internal communication network carrying information between said processing means, said server and said interface.

23. In a communication system comprising:
at least two switching offices, interconnected by trunk circuits, for selectively providing switched communication services over a plurality of communication lines connected thereto;
a central control separate from the switching offices, said central control comprising a database storing call processing data associated with a plurality of said communication lines for control of call processing through one or more of said switching offices, a call processing method comprising the steps of:
receiving a request for service via one of the communication lines;
providing a call connection from said one of the communication lines to a peripheral platform, without obtaining instructions from said central control;
communicating between said central control and said peripheral platform to identify an auxiliary call processing function to be executed by said peripheral platform in response to said request for service; and
executing the identified auxiliary call processing function via said call connection.

24. A method as in claim 23, further comprising the step of transferring the call connection from the peripheral platform to a destination communication line identified by information provided to the peripheral platform by the central control.

25. A method as in claim 23, wherein the step of executing the identified auxiliary call processing function comprises:
retrieving a message stored in a remote peripheral platform; and
transmitting the retrieved message from the peripheral platform connected to the call over said call connection to said one of the communication lines.

26. A method as in claim 25, wherein the step of retrieving a message comprises transmitting said message from the remote peripheral platform to said peripheral platform connected to the call over a communication network separate from any lines, trunks or data networks connected to said switching offices.

27. A method as in claim 23, wherein the step of communicating comprises a two-way exchange of signaling messages between said central control and said peripheral platform over a communication network separate from any lines or networks connected to said switching offices.

28. In a communication system comprising:
at least two switching offices, interconnected by trunk circuits, for selectively providing switched communication services over a plurality of communication lines connected thereto;
a central control separate from the switching offices, said central control comprising a database storing call processing data associated with a plurality of said communication lines for control of call processing through one or more of said switching offices; and
a first signalling communication network for two-way communication of messages, said first signalling communication network interconnecting the switching offices and connecting the switching offices to said central control, a call processing method comprising the steps of:
receiving a request for service via a first one of the communication lines;
providing a call connection from said one of the communication lines to a peripheral platform;

communicating between said central control and said peripheral platform via a second signalling communication network, separate from the first signalling communication network, to identify an auxiliary call processing function to be executed by said peripheral platform responsive to said request for service; and executing the identified auxiliary call processing function via said call connection.

29. A method as in claim 28, wherein the step of providing a call connection comprises the steps of:

detecting a triggering event;

responsive to the triggering event, sending a query through said first signalling communication network from one of the switching offices to central control;

transmitting call processing data from the database in the central control to the one switching office instructing the one switching office to establish the call connection to the peripheral platform; and establishing the call connection from the one switching office to the peripheral platform in response to the transmitted call processing data.

30. A method as in claim 28, wherein the step of providing a call connection comprises the steps of:

detecting a triggering event; and responsive to the triggering event, providing said call connection to the peripheral platform, without obtaining instructions from said central control.

31. A method as in claim 28, further comprising the step of transferring the call connection to a destination communication line identified by information provided to the peripheral platform by the central control.

32. A method as in claim 28, wherein the step of executing the identified auxiliary call processing function comprises:

retrieving a message stored in a remote peripheral platform; and transmitting the retrieved message to said one of the communication lines from the peripheral platform connected to the call.

33. A method as in claim 32, wherein the step of retrieving a message comprises transmitting said message from the remote peripheral platform to said peripheral platform connected to the call over a communication network separate from any lines or networks connected to said switching offices.

34. A method as in claim 28, wherein said second signalling communication network is distinct from said at least two switching offices and said trunk circuits.

35. A method as in claim 34, wherein said communication system further comprises a plurality of peripheral platforms and said second signalling communication network permits exchange of messages between said plurality of peripheral platforms separately from said first signalling communication network.

36. A method as in claim 28, wherein said second signalling communication network comprises a direct communication link between said central control and said peripheral platform and said step of communicating between said central control and said peripheral platform comprises transmitting data over said direct communication link.

37. A method as in claim 28, wherein said peripheral platform is connected to one of said at least two switching offices via an Integrated Services Data Network (ISDN) link.

38. A method as in claim 28, wherein said step of communicating via a second signalling communication network uses Transmission Control Protocol/Internet Protocol (TCP/IP).

39. A method as in claim 28, wherein said second signalling communication network provides higher capacity data transport than said first signalling communication network.

40. In a communication system comprising:

at least two switching offices, interconnected by trunk circuits, for selectively providing switched communication services over a plurality of communication lines connected thereto;

a central control separate from the switching offices, said central control comprising a database storing call processing data associated with a plurality of said communication lines for control of call processing through one or more of said switching offices, a call processing method comprising the steps of:

during processing of a call from one of the communication lines, detecting a triggering event;

if the triggering event is of a first predefined type, sending a query from one of the switching offices to the central control, transmitting call processing data from the database in the central control to the one switching office, and establishing a call connection from said one of the communication lines through at least the one switching office in response to the transmitted call processing data; and if the triggering event is of a second predefined type, providing a call connection from said one of the communication lines to a peripheral platform without obtaining instructions from said central control, communicating between said central control and said peripheral platform to identify an auxiliary call processing function to be executed by said peripheral platform, and executing the identified auxiliary call processing function via the call connection to the peripheral platform.

41. A method as in claim 40, further comprising the step of transferring the call connection from the peripheral platform to a destination communication line identified by information provided to the peripheral platform by the central control.

42. A method as in claim 40, wherein:

the sending of the query from one of the switching offices to the central control and the transmitting of call processing data from the database in the central control to the one switching office both occur via a first signalling communication network; and the communicating between said central control and said peripheral platform occurs via a second signalling communication network separate from said first signalling communication network.

* * * * *